(12) United States Patent
Porter et al.

(10) Patent No.: US 6,977,912 B1
(45) Date of Patent: Dec. 20, 2005

(54) CONTROL SIGNALLING AND DYNAMIC CHANNEL ALLOCATION IN A WIRELESS NETWORK

(75) Inventors: John David Porter, Great Shelford (GB); Walter Charles Vester, Philadelphia, PA (US); Benedict Russell Freeman, Cambridge (GB)

(73) Assignee: Axxcelera Broadband Wireless, Santa Barbara, CA (US)

( * ) Notice: Subject to any disclaimer, the term of this patent is extended or adjusted under 35 U.S.C. 154(b) by 587 days.

(21) Appl. No.: 09/592,683

(22) Filed: Jun. 12, 2000
(Under 37 CFR 1.47)

(30) Foreign Application Priority Data

Jun. 11, 1999 (GB) .................................... 9913697

(51) Int. Cl.[7] .......................... H04Q 7/00; H04L 12/28
(52) U.S. Cl. .................. 370/329; 370/333; 370/395.3; 455/450
(58) Field of Search ................................ 370/328, 329, 370/319, 332, 330, 333, 395.2, 395.3; 340/3.1; 375/346; 455/115.3, 452.1, 226.2, 226.3, 455/450

(56) References Cited

U.S. PATENT DOCUMENTS

| | | | |
|---|---|---|---|
| 5,787,080 A | 7/1998 | Hulyalkar et al. | |
| 5,845,209 A | 12/1998 | Iwata | |
| 5,898,928 A * | 4/1999 | Karlsson et al. | 455/450 |
| 6,094,424 A * | 7/2000 | Kalmanek et al. | 370/328 |
| 6,353,742 B1 * | 3/2002 | Bach | 455/453 |
| 6,466,793 B1 * | 10/2002 | Wallstedt et al. | 455/450 |

FOREIGN PATENT DOCUMENTS

| | | |
|---|---|---|
| GB | 2 292 865 A | 3/1996 |
| GB | 2 318 482 | 4/1996 |
| WO | WO 95/34957 | 12/1995 |
| WO | WO 96/12369 | 4/1996 |
| WO | WO 96/15642 | 5/1996 |
| WO | WO 97/32444 | 9/1997 |
| WO | WO 98/38825 | 9/1998 |

* cited by examiner

*Primary Examiner*—Duc Ho
(74) *Attorney, Agent, or Firm*—Finnegan, Henderson, Farabow, Garrett & Dunner LLP

(57) ABSTRACT

A dynamic channel allocation method and system for use in a wireless network operates by monitoring at least the allocated channel allocated to a particular network node to generate one or more channel metrics relating to radio conditions on the channel. The metrics generated are Received signal power, signal to noise ratio of transmissions on the network and long-term mean square of the equaliser error used in each terminal. The generated metrics are communicated back to the cell access point or the network control server over a signalling channel, and a new frequency is allocated to the cell if it is determined from the metrics that the presently allocated channel is suffering interference. The signalling channel is preferably an ATM VPI/VCI pair, such that signalling messages are transmitted as ATM cells which can be communicated across the wireless channel using the sane signalling frame as is used for payload cells.

10 Claims, 4 Drawing Sheets

CONTROL SIGNALLING AND DYNAMIC CHANNEL ALLOCATION IN A WIRELESS NETWORK

TECHNICAL FIELD

The present invention relates to a method and system for providing dynamic channel allocation in a wireless communications network during continuous network operation, and to a method and system for signalling network control messages.

More particularly, from a first aspect the present invention relates to a method and system for providing dynamic channel allocation in a wireless network arranged in a cellular configuration, and wherein transmissions in each cell are monitored at various positions throughout the cell to collect information on local radio conditions in each cell, the information then being used to dynamically allocate one of a limited number of wireless channels for data communications within the cell.

From a second aspect the present invention relates to a method and system for signalling network control messages across a wireless network using the same signalling frame as is used for network payload data.

BACKGROUND TO THE PRESENT INVENTION

The proliferation of data communications throughout recent years has caused great demand for high bandwidth reliable data networks. Furthermore, many cost advantages are to be made in deploying wireless data networks, as there is then no need for the great expense of laying cables, wiring buildings, etc., and a more flexible network service may be provided. There is however a single major disadvantage of using a wireless data network instead of a wired network in that the wireless channels over which the data are transmitted can be prone to radio interference from a variety of sources. In order therefore to provide for reliable data communications some mechanism must be provided which allows the network to survive the presence of an interfering signal.

SUMMARY OF THE PRESENT INVENTION

From a first aspect, the present invention provides a method and system providing dynamic allocation of wireless channels during continued network operation which allows a network to overcome any interference. By continuously monitoring the assigned channels' performance throughout the coverage area in order to generate one or more metrics relating to the radio conditions within the coverage area, the method and system of the present invention allow for alternative channels to be allocated to those network nodes suffering from interference on their particular current-assigned channels, thus ensuring that reliable wireless data communications can be maintained across the whole network coverage area.

According to the first aspect of the present invention, there is provided a method of dynamic frequency allocation for use in a wireless communications network geographically arranged into regions, each region containing at least one fixed base station and one or more subscriber terminals, communications between the fixed base station and the one or more subscriber terminals in each region taking place over an allocated one of a plurality of communications channels available for use by the network, the method comprising the steps of:

(a) monitoring the radio conditions on at least the allocated channel in each region;

(b) generating one or more channel metrics corresponding to the monitored radio conditions on the channel; and (c) reallocating a different channel to at least those regions where the generated channel metrics indicate that the allocated channel in those regions is suffering interference;

wherein steps (a), (b) and (c) are continuously repeated in order whereby channels may be dynamically reallocated to regions during continuous network operation.

The generated metrics are preferably any one of or a number of the received signal strength on the channel, the signal to noise ratio of transmissions between the subscriber terminals and the base station in each region, and the long-term unrecoverable channel distortion derived from the mean-square error of a decision feedback equaliser provided in each radio.

The monitoring step may further include the step of: further monitoring a plurality of the available channels in addition to the allocated channel in each region and generating a set of channel metrics for each available channel. In such a case, the re-allocating step c) re-allocates one of the plurality of the available channels on which no interference was further monitored as said different channel. In addition, where other channels are monitored, an additional metric relating to the correlation levels between the training sequence used for the present channel and the training sequences used on the other monitored channels can be undertaken.

In the preferred embodiment of the first aspect of the invention, the generated channel metrics are preferably passed over a signalling channel to a network management and control server, the network server being provided with the intelligence and means for performing the re-allocation step. Messages relating to the new channels allocated to the base stations and subscriber terminals in each region are then passed back over the network to the network terminals using the signalling channel. Preferably the signalling channel is a fixed ATM VPI/VCI pair.

The fixed base stations in each cell may locally re-allocate alternative channels to the regions in the cell, instead of the network server. Additionally, it will also be possible to allow the fixed base stations to act in a distributed manner to perform global network frequency re-allocation.

In addition, according to the first aspect of the present invention, there is also provided a system arranged to perform dynamic channel allocation for use in a wireless communications network geographically arranged into regions, each region containing at least one fixed base station and one or more subscriber terminals, communications between the fixed base stations and the one or more subscriber terminals in each region taking place over an allocated one of a plurality of wireless communications channels available for use by the network, the system comprising:

(a) monitoring means for monitoring the radio conditions on at least the allocated channel in each region;

(b) metric generation means for generating one or more channel metrics corresponding to the monitored radio conditions on the channel; and (c) channel reallocation means for reallocating a different channel to at least those regions when the generated channel metrics indicate that the allocated channel in those regions is suffering interference;

wherein said monitoring means, said metric generation means and said channel reallocation means each repeat their operations in order whereby channels may be dynamically reallocated to regions during continuous network operation.

The monitoring means may further act to monitor a plurality of the available channels in addition to the allocated channel in each region to detect at least the presence of any interference on each of the plurality of the available channels. In such a case the generation means are further arranged to generate a set of channel metrics for each of the monitored channels.

Furthermore, in such a case, the channel re-allocation means re-allocate one of the plurality of the available channels on which no interference was detected by the second monitoring means as said different channel.

The channel re-allocation means may form part of the network control server, and may execute either local or global re-colouring schemes. In such a case the generated channel metrics are communicated to the network control server over a signalling channel, the network server being provided with the intelligence and means to perform the re-allocation on the basis of the received channel metrics, and messages relating to the re-allocated channels being passed back over the network over the signalling channel. Preferably the signalling channel is a fixed ATM VPI/VCI pair.

Alternatively, the channel re-allocation means may form part of each fixed base station, whereby channel re-allocation may be performed locally for a particular cell by the base stations located in each cell. Moreover, it may be possible for the individual channel re-allocation means in each base station to act together in a distributed processing manner to perform global channel re-allocation throughout the entire network.

In both the method and the system according to the first aspect of the present invention, the available channels are allocated to the regions in such a manner that a particular region is allocated a different one of the available channels to those available channels allocated to each of the surrounding adjacent regions to the particular region.

Furthermore, each of the available channels comprises a specific frequency band together with a specific polarisation. The polarisation may be either linear, in which case it may be either horizontal or vertical, or circular, in which case it may be either left-handed or right-handed.

Moreover, in the case of the cell being divided into more than one region, each region of the cell is made to be of substantially equal area, and each of the respective fixed base stations for each region are substantially co-located.

It is an advantage of the present invention that when providing coverage to a metropolitan area comprised of many cells, spectrum re-use is highly efficient.

There is a further advantage that subscriber terminals directly measure channel metrics and report them back to the control server, providing complete information about the spectral activity occurring within the entire coverage area.

Furthermore, because the control server has access to all base stations within a metropolitan area, it has the ability to execute either a globally optimal dynamic recoloring scheme, or a locally optimal scheme that is more computationally tractable.

From a second aspect, the present invention provides a method and system of signalling network control messages within a packet-switched wireless data network comprising a number of cells, each cell containing at least one base station (Access point) and one or more subscriber terminals, base stations and subscriber terminals communicating in a time division multiple access (TDMA) manner within an adaptive variable-length signalling frame within which data packets are sent. In order to provide for network signalling, network control messages are packetised into data packets and then sent over the network within the signalling frame together with the network payload data packets. This has the advantage that no separate signalling frame is required for the network control information, and channel efficiency is therefore improved.

From a second aspect, the present invention provides a method of signalling network control messages for use in a packet-switched wireless data network geographically arranged into one or more cells, each cell comprising one or more fixed base stations and a plurality of subscriber terminals arranged in a point-multipoint manner, communications between the base station and subscriber terminals in each cell being performed on a time division multiple access (TDMA) basis, the method being characterised by comprising the steps of:

defining a signalling frame for time division duplex transmission of all data packets between the base station and subscriber terminals; and transmitting the network control messages as data packets within the defined signalling frame.

Furthermore, the second aspect also provides a system for signalling network control messages for use in a packet-switched wireless data network geographically arranged into one or more cells, each cell comprising one or more fixed base stations and a plurality of subscriber terminals arranged in a point-multipoint manner, communications between the base station and subscriber terminals in each cell being performed on a time division multiple access (TDMA) basis, the system being characterised by comprising:

means for defining a signalling frame for time division duplex transmission of all data packets between the base station and subscriber terminals; and means for transmitting the network control messages as data packets within the defined signalling frame.

In a preferred embodiment the data packets transmitted within the signalling frame are preferably asynchronous transfer mode (ATM) cells.

Further, within the preferred embodiment the network control messages are preferably packetised directly into ATM cells such that the entire 48-byte cell payload contains data from the network control messages with no higher layer headers or trailers. The ATM cells are then preferably sent over a fixed ATM VPI/VCI pair dedicated to the network signalling messages. The VPI/VCI pair is preferably permanent.

The preferred embodiment has the following advantages that because the ATM transport layer incorporates the use of ARQ, signalling information is transmitted in a robust, guaranteed-delivery manner. Furthermore, as a fixed ATM VPI/VCI pair is used throughout the network, compatibility with the ATM equipment connected to the wireless equipment is guaranteed. Moreover, because the ATM transport layer is used rather than the IP network layer, less overhead is required to send signalling information through the network, leading to more efficient passage of signalling messages and faster processing of these messages within the network (due to the smaller cell size of ATM relative to the size of IP datagrams). Finally, the passage of the signalling information within the ATM transport layer allows the network to assign a priority to signalling traffic (typically the highest priority), enabling the fastest response possible of the network equipment to the signalling command.

In an alternative embodiment, the network control messages are packetised into Internet Protocol (IP) datagrams, and these subsequently chopped up into ATM cells for transmission between the base stations and subscriber terminals. This has the advantage that delivery of the message is guaranteed, and compatibility of the message with all networking equipment involved in the network.

The second aspect of the present invention has the overall advantage that no separate signalling frame, subframe, or preamble identifier is required to communicate signalling information through the network.

BRIEF DESCRIPTION OF THE DRAWINGS

Further features and advantages of both aspects of the present invention will become apparent from the following detailed descriptions of particularly preferred embodiments thereof, presented by way of example only, and by reference to the accompanying drawings, in which.

Figure 5:
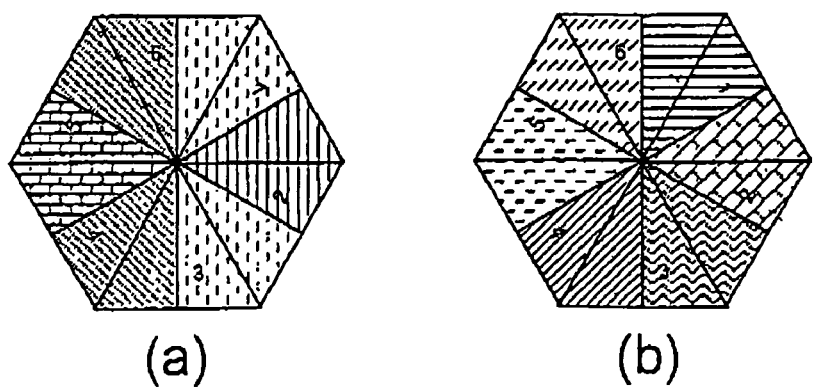
FIG. 5 demonstrates initial channel allocations used in one cell within the present invention.

Within the drawings, the fill patterns used in each region of FIG. 5 demonstrate the example channels and polarisations which can be used in each region of a cell upon an initial frequency assignment. The fill patterns depicted correspond to those used in FIG. 2, such that it is possible to determine from the fill pattern which channel is used in each region and whether the polarisation is horizontal or vertical.

DESCRIPTION OF THE PREFERRED EMBODIMENTS

Preferred embodiments of the two aspects of the present invention will now be described. It is to be understood that the following descriptions are to be considered as non-limiting examples, and that the methods and systems of both aspects of the present invention may find application in any wireless data communications network. The common background to the two aspects will be described first with respect to FIG. 1.

Common Background

Figure 1:
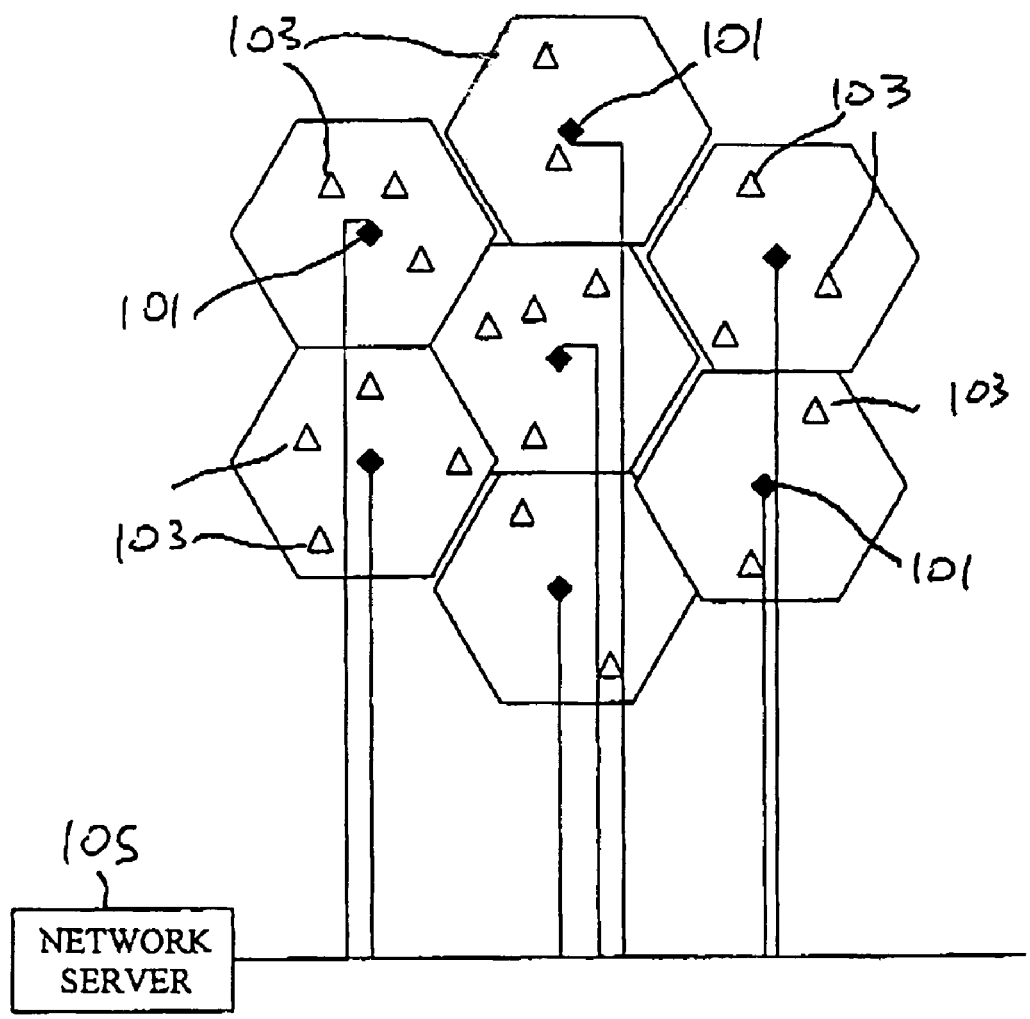
FIG. 1 illustrates the layout of the network used in the present invention.

As shown in FIG. 1, the coverage area of the network of the present invention is divided into cells, each cell having a central fixed base station (101) referred to herein as an access point, and one or more remote subscriber terminals (103). Since the actual coverage pattern of each cell is circular, the deployment of cells provides some overlap among adjacent cells. Each access point 101 is provided with a number of separate transceivers each arranged to cover a fixed sector, an ATM switch, and an access point control server. The access points communicate with a network control server 105 which provides centralised network management and control functions. Connections to a wide area backbone network are provided by backhaul links from the access points (not shown).

Figure 2:
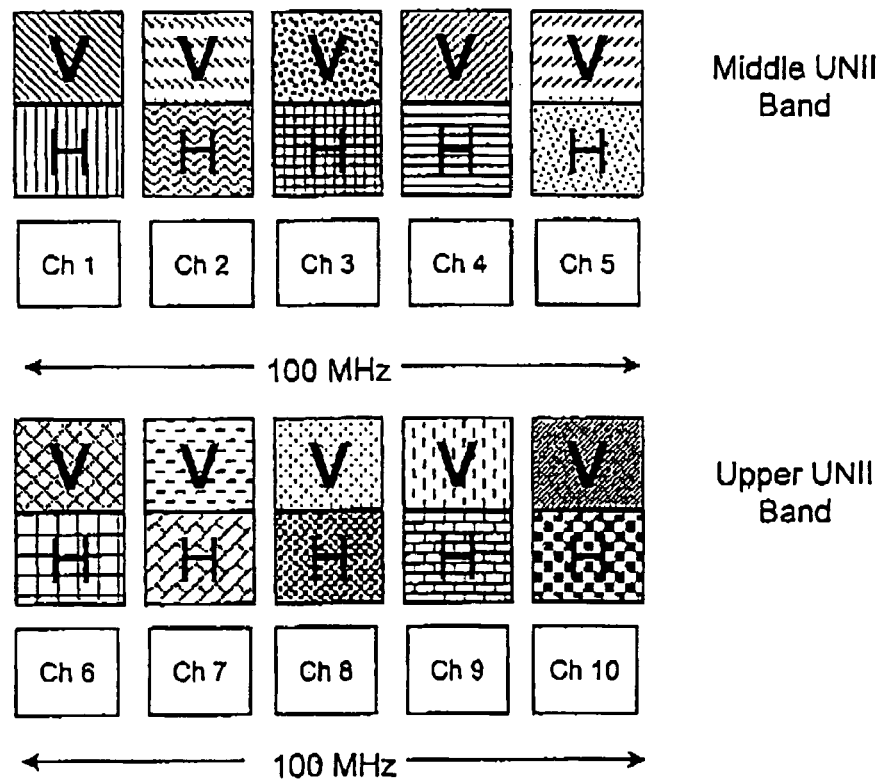
FIG. 2 shows an example channelisation of a frequency band used in the embodiments of the present invention.

The subscriber terminals 103 are at fixed locations. This allows the use of highly directional antennas at the cell site and at the subscriber site. In the preferred embodiment the system uses the United States UNII band, which provides more total available bandwidth than this network requires to provide service to a metropolitan area. Because the band of operation is unlicensed, the network must have some mechanism for surviving the presence of an interfering signal. The extra bandwidth provides reserve channels that can be called into use in the presence of interference. The channelization of the UNII band used by this network is shown in FIG. 2. As will be seen, in order to increase the re-use of the available spectrum, the system takes advantage of vertical and horizontal polarization of antennas to effectively double the number of channels.

In the present particularly preferred embodiments, each cell consists of six sectors, with one access point per sector. An access point is capable of acting as a complete cell base station, providing service to up to 256 subscriber terminals, for example. However, to increase network density it is paired with a directional antenna to cover only a 60 degree horizontal beamwidth, or $\frac{1}{6}^{th}$ of the total coverage area of the cell. Each access point uses time division multiple access to distribute access to the wireless medium among the subscriber terminals it serves. Because the transmit activity of each access point will be statistically uncorrelated with that of the other access points, it must be assumed that, unless adequate signal attenuation exists between access points, multiple access points of a single cell sharing the same frequency will cause co-channel interference to each other. The operation of such a network and access scheme is described in detail in our co-pending British Patent Application No. 9907481.7 (any necessary features of which may be required for understanding the present invention being incorporated herein by reference), and will also be described in more detail later in relation to the provision of network control signalling in the network.

Figure 3:
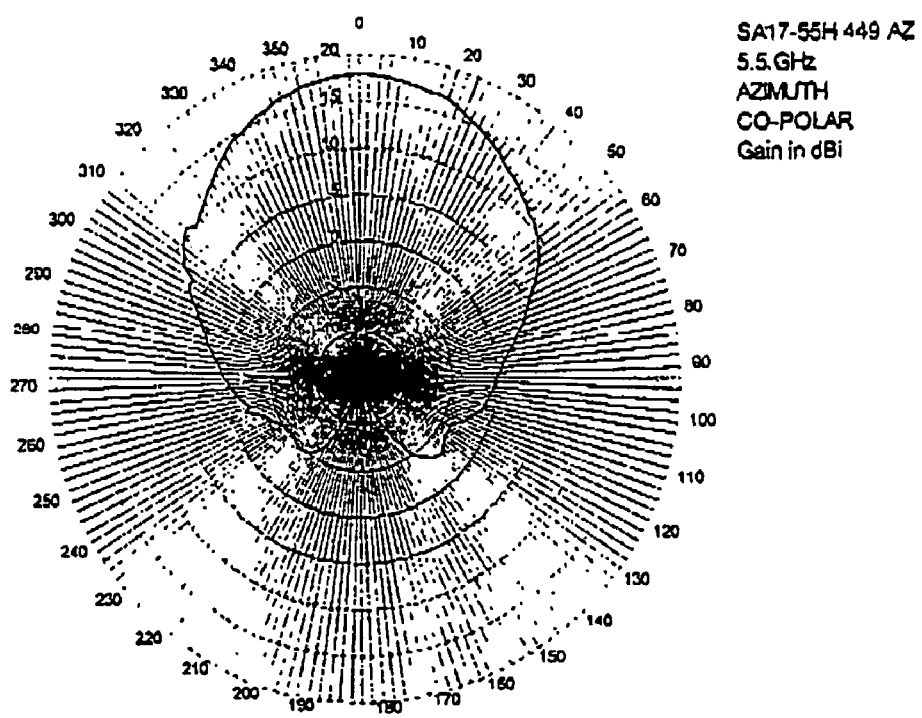
FIG. 3 shows a polar plot of the radiation pattern in the horizontal plane of an example antenna used within the method and system of the present invention.
Figure 4:
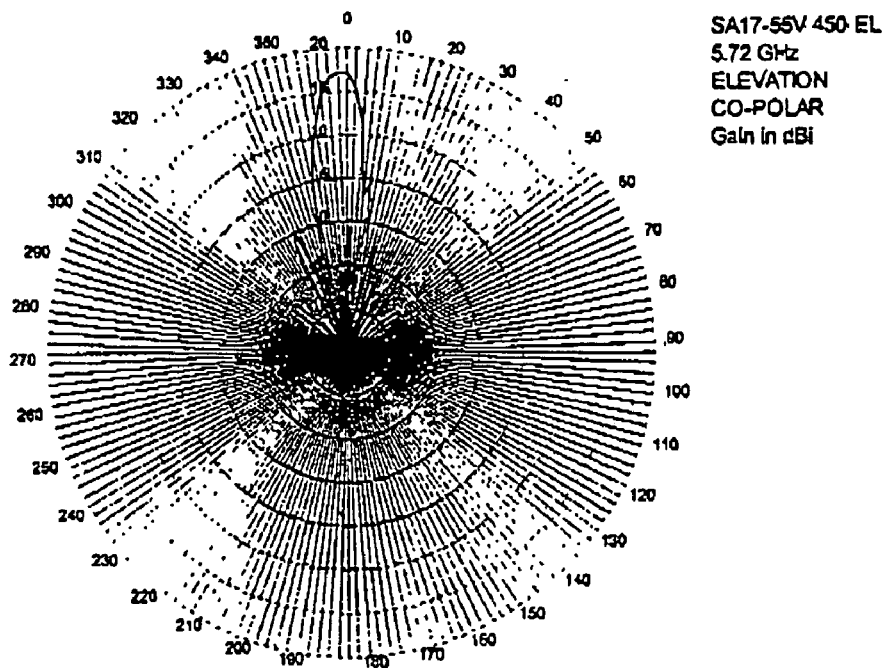
FIG. 4 shows a polar plot of the radiation pattern in the vertical plane of an example antenna used within the method and system of the present invention.

When assigning transmission frequencies to the sectors within a cell, the pattern of the access point antenna becomes the most critical consideration. As mentioned previously, the fact that the access point and subscriber terminals are fixed allows highly directional antennas to be used at both ends of the link, and FIGS. 3 and 4 show the respective horizontal and vertical radiation patterns of a preferred access point antenna which can be used. From theses plots it is easily apparent that the preferred antenna employed is highly directional, with a −3 dB beamwidth of approximately 60° in the horizontal plane, and of less than 10° in the vertical plane. Frequency re-use in different cells and sectors within the network thus becomes a possibility due to the high spatial separation of radiation patterns possible with such an antenna. Additional isolation between access points may also be provided using the vertical radiation pattern of the access point antenna. By mounting the access point antennas at slightly different heights, the highly directional vertical pattern provides additional signal power isolation to protect against network self-interference.

In addition to the pattern of the access point antennas, there are several other key issues of the network equipment and the wireless network deployment that affect the channel allocation among the sectors of a cell and between cells. Of particular relevance is the co-channel interference tolerance of the radio equipment (the signal to interference plus noise ratio required for acceptable data error rate). Furthermore the tolerance of the radio equipment to an adjacent channel interferer must also be taken into account, as must the radiation pattern of the access point and subscriber terminal antennas, as well as the separation in frequency of the channels used within a single cell. Finally, the coverage area overlap of adjacent cells is also of importance.

Having regard to the above points, two example initial channel allocation schemes will now be described, which may be used by the network control server as 'power-up' or 'reset' states before any dynamic channel allocation is performed. The two schemes presented are by way of example only, and other such schemes will be apparent to the man skilled in the art which provide a comparable performance of the schemes detailed herein, and which may be used with the present invention.

The first scheme to be described uses two frequency bands per cell, with each band having either horizontal or vertical polarisation to give effectively four different channels. The use of horizontal or vertical polarisation effectively doubles the number of available channels. FIG. 5(a) illustrates such four channel allocation within a cell. From FIG. 5(a) it will be seen that two sectors, whose main beams have an angular separation of 120 degrees, are assigned the same frequency and polarization. The horizontal and vertical radiation patterns of the antenna and the signal attenuation of free space are used to provide the required isolation between the sector coverage areas. In particular, the antennas of the two access points sharing the same frequency and polarization are mounted at heights differing by several centimeters, in order to provide additional isolation due to the vertical angular separation. It is then necessary to make the third sector sharing this frequency of opposite polarization, in order to provide isolation between cells when they are deployed in a multi-cell network. With such a channel allocation to is possible to arrange four adjacent cells next to each other such that their adjacent sectors are of opposite polarizations, thus providing an additional 20 dB of isolation between them. A "super-tile" of four cells may be arranged together in this manner such that no sector has an identical frequency and polarisation allocation as any adjacent sector. Such "super-tiles" of four cells may then be combined to cover as large an area as necessary.

An alternative initial frequency allocation using three frequency bands per cell is shown in FIG. 5(b). Here, to improve isolation, an additional frequency is used per cell meaning that three frequencies and hence six channels are provided. With this arrangement two sectors of a cell share the same frequency. They are in 180 degree opposition, and are of opposite polarization, providing an additional 20 dB of isolation above the free space loss and antenna pattern loss. Adjacent cells can then be arranged such that overlapping coverage areas are assigned different frequencies. Again, a four cell "super-tile" may be created which ensures that no single sector is adjacent to another sector with an identical frequency and polarisation channel assignment. The three-frequency per cell scheme typically improves upon the two-frequency per cell scheme by an increased polarisation loss and increased spatial separation between two sectors which are assigned the same channel. The super-tiles may be combined to cover as large an area as necessary.

Having described the common background to the two aspects of the present invention, specific embodiments relating to each aspect will now be described.

Dynamic Frequency Allocation

The purpose of dynamic frequency colouring is to allow the network to autonomously adapt to changing channel conditions while the network is in active operation. The network needs to monitor performance aspects of the available channels, either directly or indirectly, in order to know which new frequency assignments to make.

In the particularly preferred embodiment of the first aspect of the present invention, the wireless network is deployed in a manner that atmospheric and thermal noise are not significant sources of performance degradation. Rather, man-made interferers, namely periodic pulse noise from electrical equipment, and other intentional radiators operating in our network's band of operation, including elements of the network itself, are the most serious threats to performance.

The network gets incomplete information if it only monitors the wireless channels at the access points. In order for the network controller (referred to herein as the control server) to have complete knowledge of the channel conditions throughout the network, it is also necessary for each of the subscriber terminals to also sense the channels and report metrics back to the control server via a low bandwidth signalling channel. The control server will then collect the information into an aggregate database and execute the frequency re-assignment. The frequency re-assignment may be algorithmically based.

Various channel metrics may be collected at each subscriber terminal and access point and subsequently used to determine the frequency re-allocation which should be applied. The particularly preferred embodiment described herein collects and uses the following.

The first metric to be collected is the Received Signal Strength (RSSI). This is measured using a peak-driven digital AGC block that operates within the modem of each subscriber terminal/access point. This gives a coarse measure of total power present on the channel, to within 10 dB, regardless of its source. This metric can be correlated against distance to calculate how obstructed the air link path is and it is also indicative of what link margin is currently available. In addition this metric provides an almost instantaneous measure and has a very fast response time.

The next metric is the Signal to Noise Ratio of the access point downstream transmissions to the subscriber terminals. This is found using an average of the correlation strength of the downstream preamble of the signalling frame from past downstream bursts. This also gives a measure of the dispersion present on the channel, and furthermore also has a very fast response time.

Another metric is the unrecoverable channel distortion. This is calculated using an average of the mean square error output of a decision feedback equalizer provided at each subscriber terminal and access point and used to remove inter-symbol interference (ISI) from the received data caused by the limited channel bandwidth. The ISI that can be removed will eventually cease to contribute to the magnitude of the channel equalizer error. Since the channel is stationary over relatively long time periods (relative to the training time of the equalizer), the long-term average is a valid metric to report. Unlike the previous two metrics described, unrecoverable channel distortion is a long term metric with a response time similar to the detection of bit error rates and packet error rates.

The above three metrics relate to the actual channel which a particular access point has been presently allocated and upon which is presently transmitting. In addition to the above, it is also possible for subscriber terminals and access points to monitor other channels available to the network, and especially those upon which network traffic is being passed in other network cells. As will be appreciated from the description of initial frequency colouring schemes given earlier many radios in a re-use pattern are using the same spectrum simultaneously for communication and the aim of the cell planning is to make sure that these radios are sufficiently well spaced, with correct antenna alignments, such that they are all effectively the only users of that spectrum in their locality. However, due to the anomalous & complex nature of propagation, it cannot be guaranteed that co-channel interference won't occur in a re-use pattern. The present invention therefore also provides for the measurement of a fourth metric aimed at providing a measurement of the co-channel interference which occurs between different network nodes, as will now be described.

In order to allow for measurement of co-channel interference, all those Access Points (APs) using the same channel (frequency) must use a different correlation (or training) sequence in their signalling frames. The sequences must all be orthogonal or at least have low cross correlation properties. The radios correlate against their own known training/correlation sequence to identify the start of a frame or burst and to recover symbol timing. The correlation process gives a coding gain (Gain=10*log (number of symbols in sequence)) which makes it possible to pull a signal out of the background thermal noise. It then becomes possible to spot a correlation sequence of a carrier that is too weak to successfully use, but strong enough to cause some co-channel interference.

In order to generate a fourth metric relating to co-channel interference, each radio in the network (both Subscriber Units (SUs) and APs) regularly attempt to correlate against all correlation sequences in use. If a correlation is obtained then the correlation level is reported back to the network control server over the signalling channel as the fourth metric, from which it is then possible to approximate received signal power. The control server is then able to build up a picture of co-channel interference in the re-use pattern and obtain a better idea of how well the re-use pattern is working. In use it is expected that Aps and SUs with high Packet Error Rates (ie not doing well), but high RSSIs (ie a strong wanted signal) are suffering from co-channel interference. If their correlation scan for other network carriers confirms this, then the offending sector, from which the interference originates, can be identified from the particular correlation sequence detected and some local re-colouring can be applied to the re-use pattern to try and relieve the problem.

As the network of the particularly preferred embodiment operates in a broadcast manner, downstream bursts broadcast from the access point are always available to be demodulated by each subscriber terminal. There is thus guaranteed network traffic available for the subscriber terminal to use in updating its channel metrics. Note that all of the first three of the above described metrics may be made available for the operational frequency of the subscriber terminal's access point, and also for any other frequencies that have active network traffic and are of sufficient signal strength to be monitored by the subscriber terminal. In additional the fourth metric is preferably available from every radio in the network relating to co-channel self interference between network radios. In contrast, only the RSSI can be measured for all channels being monitored on which there is no network traffic i.e. only RSSI can be measured for a third-party interferer.

In order to allow for the metrics to be communicated to the access points and onto the control server, the wireless access network provides ATM style network operation. A separate VPI/VCI pair is used for each data traffic stream sent to and from a particular subscriber terminal. An additional VPI/VCI pair is used for network-wide signalling between the subscriber terminals and the base station control server. A separate VPI/VCI pair is then used exclusively for reporting the channel metrics and sending dynamic channel assignment information between access points and subscriber terminals. The subscriber terminals therefore all report back their measured statistics to the control server via this wireless network signaling virtual path/virtual circuit. Contained within the message are the metrics and an access point identifier, which gives indication as to the geographic location of the subscriber terminal doing the channel monitoring. The metrics fed back from all of the subscriber terminals that share a single access point are all weighted equally and averaged.

Because the control server aggregates the reported metrics, it has the freedom to execute whatever frequency assignment scheme is most appropriate. The network control server may execute a globally optimal channel recolouring scheme, but such a network-wide dynamic channel allocation problem is an np-complete problem that must use iterative methods to arrive at an acceptable coloring of the network. It is therefore also possible for each cell base station to perform a locally optimal dynamic frequency allocation, which will allow the network to stabilize and perform at an acceptable level, with much lower implementation complexity than a globally managed frequency allocation scheme. Here, a locally managed channel allocation algorithm which does not yield a globally optimal frequency allocation can still provide satisfactory network performance.

To implement such a local scheme, each subscriber terminal and access point within a cell periodically monitors all available channels for operation, and accumulates long term average metrics. The assumption is made that, by monitoring all channels, subscriber terminals will detect traffic originating in adjacent cells which will interfere. Each subscriber terminal reports the collected metrics back to the access point in the manner described above, the access point then choosing its new frequency of operation based only on the metrics reported within its cell. If each access point performs this operation independently from the other access point, and the operation is repeated either continuously or at regular intervals, then an effective distributed processing implementation of frequency re-colouring is obtained.

The present invention also provides a number of further features and advantages. For example, subscriber terminals can be commanded into monitor mode, in which they briefly scan all candidate channels, accumulate metrics, report them back to the control server, then return to normal operation. Signalling messages to command the subscriber terminals into monitor mode are passed over the network signalling channel.

Furthermore, the subscriber terminals may auto-sense the frequency of operation of their base stations upon power up, and hence need no a priori knowledge of the network frequency allocation nor of their own geographic position with respect to cells using other frequencies.

Furthermore, those subscriber terminals that are located at the cell overlap areas can be automatically switched among access points in order to improve the balance of network traffic loading among access points, the switching occurring by virtue of the dynamic frequency allocation. In such a case, however, the subscriber terminal located near the edge of the cell must be provided with either a steerable antenna, or a second antenna pointed at the adjacent access point to the present access point.

Moreover, each subscriber terminal may have the ability to monitor other channels during idle periods, making it possible to gather channel metrics without wasting any network bandwidth. Furthermore, subscriber terminals can also be commanded to monitor all other channels at regular intervals, giving a fixed and known sample distribution to the channel metrics. The ability to monitor the channels using the subscriber terminals allows the network to gather spatial information as well. It should therefore be possible to determine interferer location and velocity.

Finally, dynamic channel allocation may be performed either globally for the whole network, or locally for a particular cell, or group of cells. Whichever scheme is adopted, it will be understood that the re-allocation can be performed centrally by the network control server, or alternatively by the fixed base stations operating in a distributed manner.

Network Signalling

As will be apparent from the above discussion, the provision of a signalling channel for communication of channel metrics from the subscriber terminals to the access points and on to the network server, and for communication of network signalling commands such as channel re-allocation commands or commanding the subscriber terminals into monitor mode is necessary for a successful network wide implementation of the channel allocation method of the first aspect of the present invention. A second aspect of the present invention is therefore concerned with the a provision of such a signalling channel, and will be described in relation to a number of embodiments.

In a first embodiment of the second aspect of the present invention, with reference to FIG. 1, consider the case where a network signalling command is to be passed from the network control server or an access point to the subscriber terminals in a cell. First a network control message or datagram is generated containing data which can be translated and interpreted by the subscriber terminals as a network control data. The network control message is packetised into data packets and if originating at the network control server is sent down to the access points. The data packets contain some form of identifier to identify their payload as part of a network control message, the identifier being, for example, a particular address field, or other control field provided in the packet header or trailer. At the access points the data packets are received together with other data packets representing payload data, being data generated by higher network layers and applications, and all the received data packets are buffered at the access point. A radio signalling frame is defined by a medium access controller (MAC) arranged to control the access to the channel and to determine how and when the data packets are to be transmitted onto the channel.

The radio signalling frame preferably contains a preamble for frame synchronisation, together with error detection bits and cell acknowledgement bits. The frame may be of fixed or variable length, and in addition to the control and synchronisation fields is provided with time slots in which data packets are scheduled for transmission. One or more data packets can be transmitted in each direction per signalling frame.

To implement the signalling channel according to the second aspect of the present invention, the MAC schedules those data packets containing network control messages slots for transmission in the signalling frame, and the data packets are then transmitted within the frame. The signalling data packets are preferably scheduled slots by the MAC before the other data packets, but where there are spare slots within a signalling frame, and there are no further signalling packets to be sent, then other data packets containing payload data can be sent in the same frame. At the subscriber terminals the signalling packets are received and identified as containing network control messages by virtue of the address or other identifier information applied to the packets. The use of a unique address is particularly preferred as it improves channel efficiency as no additional fields must be provided in the packet.

The above arrangement of the second aspect of the invention has the primary advantage that as the data packets containing the signalling messages are transmitted to the subscriber terminals in the same radio signalling frame as is used for payload data packets, them no separate signalling frame, subframe, or preamble is required, thus improving overall channel efficiency.

A particularly preferred embodiment of the second aspect of the present invention will now be described with reference to FIG. 6.

Figure 6:
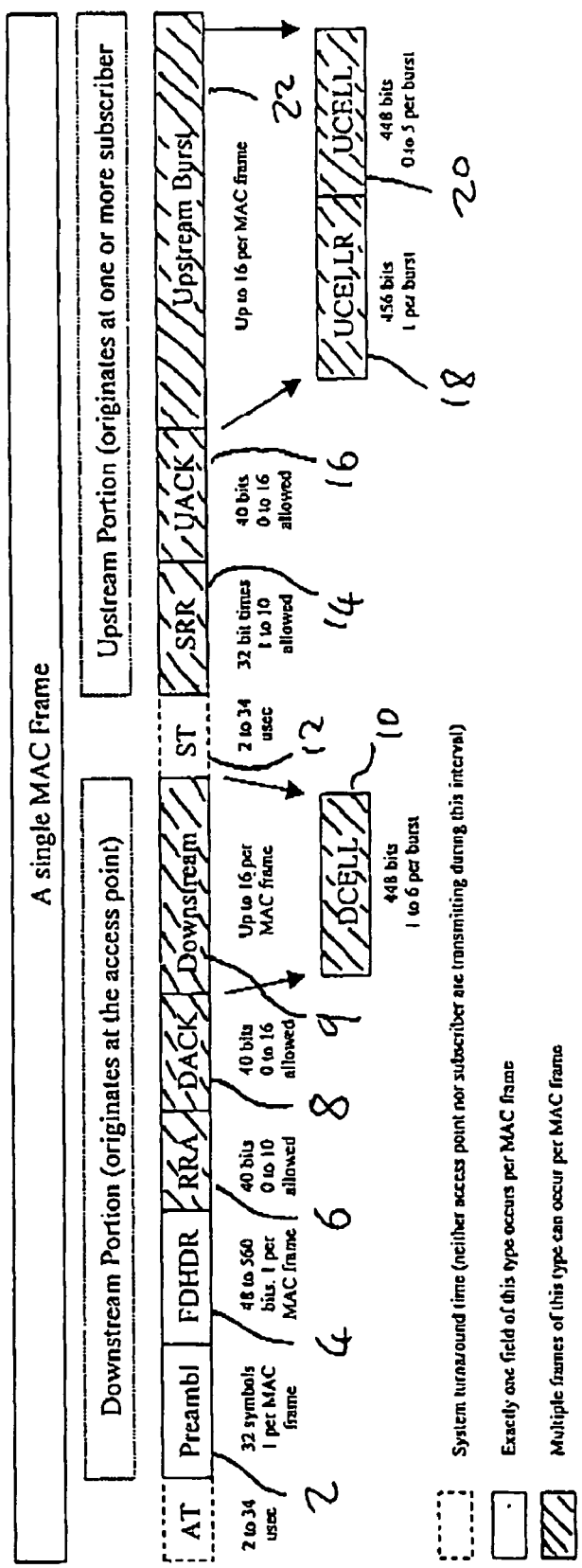
FIG. 6 illustrates a signalling frame used in a preferred embodiment of the present invention.

FIG. 6 shows the definition of a preferred signalling frame used in the second aspect of the present invention. As in the first embodiment, the definition and control of the signalling frame is made by a medium access controller (MAC) provided at every access point. Similarly, each remote subscriber terminal is also provided with a compatible medium access controller for responding to the access point MAC in a master-slave manner: the subscriber terminals request access to the medium and the access point has the ability to grant access or fail to grant access based on the current level of network utilisation. Access to the network is granted in the form of time slots—when a subscriber terminal is granted the ability to access the wireless network medium, it is granted one or more time slots in which it can transmit. Within the granted time slot the entire medium capacity is available to the subscriber node to transmit its payload data. By referring to a medium access controller, it is to be understood that either a hardware or software based control means is envisaged and that reference to a controller as such implicitly includes reference to those control means required at both the central access point and at the subscriber terminals. In this respect, the medium access controller (MAC) therefore corresponds to those network means, whether hardware or software based, that would approximate in part to the Network-level and/or the Data-level of the ISO Open Systems Interconnection 7-layer Reference Model. The MAC may be implemented in a Field Programmable Gate Array (FPGA).

The constituent parts of the signalling frame (hereafter referred to as MAC frame) of FIG. 6 will now be described.

FIG. 6 shows the overall structure of a single MAC frame. The MAC frame consists of a downstream portion, generated by the access point and broadcast to all subscriber terminals in the cell, and an upstream portion, which consists of a contention interval and all data bursts being sent from subscriber terminals back to the access point.

The downstream portion consists first of a downstream preamble (2). The preamble is a Physical layer synchronization sequence of fixed length, used for frame acquisition and channel estimation. Only one downstream preamble may occur per MAC frame. Immediately following the preamble is the frame descriptor header (FDHDR) (4). The FDHDR describes the complete contents of the remainder of the MAC frame. The size of the FDHDR may vary. The FDHDR contains a map of all traffic, upstream and downstream, to occur within the MAC frame. After achieving bit synchronisation on the MAC frame via the preamble, subscriber terminals demodulate the FDHDR and from that gain complete knowledge of the traffic that will occur within the remainder of the frame. Only one FDHDR may occur per MAC frame.

Following the FDHDR is the reservation request acknowledgement (RRA) portion 6. The RRA acknowledges a request by a subscriber for upstream time slots and can also communicate signal propagation delay. There is a single RRA for each reservation request that was made during the contention interval from the previous MAC frame, although in the case where no reservation requests were made in the previous MAC frame, then no acknowledgements will be sent.

Following the RRA comes the Downstream Acknowledgement (DACK) portion 8 containing DACK cells. Each DACK cell contains a downstream ack or nack of a single upstream burst from a previous MAC frame. There is a single DACK cell for each upstream burst from the previous MAC frame, although in the event that there were no previous upstream bursts then no DACKs will be sent.

Following the DACK portion comes the Downstream Burst (9). The MAC operates on a principle of cell bursts for communicating payload data between the access point and the subscriber terminals by allowing multiple cells of data to be sent to or from a particular subscriber unit at a time. A burst must always consist of at least one cell. In upstream bursts, this single cell must be an upstream cell with reservation request (UCELLR) (18). Additional cells in the upstream burst are in the format of a UCELL—an upstream cell without reservation request (20). Upstream cells are discussed in more detail later. Downstream bursts can also consist of multiple cells, but there is only one type—the downstream cell (DCELL) 10. There can be many DCELLs—either several directed to a single subscriber terminal, or several directed to several subscriber terminals. Each DCELL contains one ATM cell of payload data. Currently the MAC allows bursts to have a maximum size of six cells, although more or less cells may be designated per burst if required in a future implementation without departing from the scope of the present invention. The contents of a DCELL are shown below in Table 1.

TABLE 1

Contents of a DCELL

| Field Tag | Description |
|---|---|
| Sync | 4 symbol synchronization burst |
| SU_ID | ID of the subscriber unit to which the payload data is directed. |
| SEQ | Sequence number. Used by the MAC to resequence cells that get out of sequence due to cell loss and subsequent cell repetition. |
| Condensed ATM Header | Includes Virtual Path Identifier (VPI), Virtual Channel Identifier (VCI), Traffic Type, Cell Loss Priority. |
| Payload | Payload data. |
| CRC | Cyclic redundancy code. Used to verify correct receipt of the downstream cell. |

The downstream burst concludes the downstream portion transmitted by the access point and received at all subscriber terminals. There then follows a slight delay due to subscriber turnaround time (STT) 12. The STT varies with distance to the farthest subscriber unit. A typical maximum distance to a subscriber unit could be, for example, 5 km, although this obviously depends on the network configuration and the size of each network cell.

Following the STT comes the Upstream Portion of the MAC frame, being data transmitted from the subscriber units to the access point. The entire expected structure of the upstream portion has already been communicated to each and every subscriber terminal in the FDHDR transmitted in the downstream portion. Therefore, each subscriber terminal knows whether or not it is permitted to transmit in the upstream portion, what data it is to transmit, and when it is to transmit this data. In this way absolute control of the contents of the upstream portion can be controlled by the access point. With such a mechanism, however, it becomes necessary to define a period in which subscriber terminals can first communicate a request for transmission permission to the access point, without which no subsequent permission would ever be granted. This period forms the first part of the upstream portion, being the subscriber reservation request (SRR) portion 14.

The SRR is a contention based reservation request interval. If a subscriber terminal has been sitting idle with empty data queues, the arrival of a burst of data on its physical port will force it to request a time slot reservation from the access point. Because the subscriber terminal has no active reservations, and because it is believed that at any given time the number of terminals making initial bandwidth requests will be small, it is reasonable to force the subscriber terminals to contend for reservations. This contention window is kept as small as possible while still allowing reasonable success probability by employing a novel implementation of aloha contention control schemes. Once the subscriber terminal's reservation request has been acknowledged by the access point, the subscriber terminal ceases requesting bandwidth in the contention slots, allowing other terminals access to the contention interval. The number of SRR's that may occur in one MAC frame is communicated to the subscriber terminals in the FDHDR. Multiple slots can be made available during times of heavy request traffic. Furthermore, the start of the contention interval can be calculated by the subscriber terminals by virtue of the FDHDR indicating to each terminal the number of RRAs, DACKs and the structure of the downstream burst in the subsequent downstream portion of the MAC frame. The contention interval then begins immediately after the end of the downstream burst, allowing for the STT.

Following the contention interval comes the upstream acknowledgement portion 16, containing upstream acknowledgement (UACK) cells of each downstream burst received during the downstream portion. Each UACK indicates upstream ack or nack of a single downstream burst from a previous MAC frame. As many UACKs may be transmitted in each upstream acknowledgement portion as there were downstream bursts in the downstream portion.

Following the upstream acknowledgement portion comes the upstream burst portion 22, containing cell bursts from subscriber units which were granted permission in the FDHDR to transmit payload data to the access point. The FDHDR from the downstream portion contains the instructions to the subscriber terminals on when to transmit a burst in the upstream burst portion, and what the burst is expected to contain. Each upstream burst contains one or more data cells with the same traffic type being sent from a particular subscriber terminal. Each upstream burst made in the upstream burst portion may be from a different subscriber unit, or alternatively may be from the same subscriber unit, depending upon the channel allocations granted to the subscriber units. In this way channel allocations can be dynamically arranged between the subscriber terminals from MAC frame to MAC frame, depending on the network traffic loading and the traffic priority. As mentioned earlier, each upstream burst must contain a single upstream cell with reservation request (UCELLR) 18, and zero or more upstream cells without reservation request (UCELL) 20. The condition that a burst must contain a UCELLR allows a subscriber terminal to maintain its channel reservation until all of its payload data has been sent, thus meaning that the subscriber terminal need not transmit again during the contention interval to request channel allocation to transmit the remainder of its data. This combination of the reservation maintenance request and the upstream cell into one message allows a single downstream acknowledgement to serve as both reservation request acknowledgement and payload cell acknowledgement, thus improving bandwidth efficiency.

The contents of a UCELLR are described below in Table 2.

TABLE 2

Upstream Cell with Reservation Request (UCELLR) structure

| Field Tag | Description |
|---|---|
| Preamble | Physical layer synchronization sequence |
| Sync | 8 bit MAC framing synchronization sequence |
| SU_ID | ID of the subscriber unit from which the payload data is originated. |
| RSV_MAINT | Reservation maintenance. Used by the subscriber terminal to continue requesting time slot reservations without contending for them. |
| Cells | Number of time slots being requested by the subscriber unit for future MAC frames |
| Tr-Type | Traffic Type of the data to be sent by the subscriber unit in future MAC frames. |
| SEQ | Sequence number. Used by the MAC to resequence cells that get out of order due to cell loss and retransmission |
| Condensed ATM Header | Includes VPI, VCI, Traffic Type, Cell Loss Priority. |
| Payload | Payload data |
| CRC | Cyclic redundancy code. Used to verify correct receipt of the downstream cell. |

The contents of a UCELL are shown below in Table 3.

TABLE 3

Upstream Cell with no Reservation Request (UCELL)

| Field Tag | Description |
|---|---|
| Preamble | Physical layer synchronization sequence |
| Sync | 8 bit MAC framing synchronization sequence |
| SU_ID | ID of the subscriber unit from which the payload data is originated. |
| SEQ | Sequence number. Used by the MAC to resequence cells that get out of order due to cell loss and retransmission. |
| Condensed ATM Header | Includes VPI, VCI, Traffic Type, Cell Loss Priority. |
| Payload | Payload data |
| CRC | Cyclic redundancy code. Used to verify correct receipt of the downstream cell. |

Having described the structure of the MAC frame and network layer, the provision of a signalling channel within the frame will now be described with reference to the OSI 7-layer reference model.

More particularly, within the present preferred embodiment, the MAC layer generally corresponds to the data and network layers of the OSI model (layers 2 and 3). The transport layer is preferably provided using a wireless ATM layer which incorporates full ATM Adaptation Layer 5 (AAL5) compatibility. ARQ is provided between APs and SUs by the provision of the upstream and downstream acknowledgement portions of the MAC frame, as previously described.

In order to provide network signalling, network control messages are generated by a network control application provided at the access points, subscriber terminals, or the network control server and are passed to the adaptation layer where an AAL5 trailer is added and padding is added to the message to make the message a multiple number of ATM cells long i.e. the number of bytes in the message is a multiple of 48. The AAL5 cell is then passed to the ATM layer for chopping up into ATM cells, each ATM cell having a known Virtual Path Indicator (VPI) and Virtual Circuit Indicator (VCI) in the cell header corresponding to a permanent ATM VPI/VCI pair set up in advance for use as the signalling channel. The payload type (PTI) field and/or Cell loss priority (CLP) field of the ATM cell header may be set appropriately to indicate that the cell is carrying a network control message.

Once the message is encapsulated within ATM cells, the ATM cells are passed to the MAC for transmission between the subscriber terminals and respective access points in the MAC frame. Here, the ATM cells containing the signalling messages are queued in the MAC cell buffer together with other payload cells, and allocated a time slot for transmission in the MAC frame in the usual manner. Preferably the signalling cells are allocated time slots in advance of the other payload cells due being assigned a high cell priority. The cells are then transmitted within the MAC frame as UCELLRs, UCELLs, or DCELLs depending on the direction and length of the signalling message.

At the receiving terminal the ATM cells are retrieved from within the received UCELLRs, UCELLs or DCELLS and the opposite operations to those described previously occur. That is, the retrieved ATM cells are passed back to the ATM layer for any switching and routing and for subsequent reconstruction of the AAL5 cell, and then passed to the AAL5 layer. Here, the AAL5 padding and trailer is removed thus retrieving the original network control message, which is then passed to the higher layer network control application for interpretation and action.

Signalling is thus provided throughout the network by sending the signalling messages as ATM cells along an ATM VPI/VCI pair, which is consistent throughout the network. This implementation has several advantages:
1) Because the ATM transport layer incorporates the use of ARQ, signalling information is transmitted in a robust, guaranteed-delivery manner.
2) A fixed ATM VPI/VCI pair is used throughout the network, guaranteeing compatibility with the ATM equipment connected to the wireless equipment.
3) Because the ATM transport layer is used rather than the IP layer, less overhead is required to send signalling information through the network, leading to more efficient passage of signalling messages and faster processing of these messages without the network (due to the smaller cell size of ATM relative to the size of IP datagrams).
4) Passage of the signalling information within the ATM transport layer allows the network to assign a priority to signalling traffic (typically the highest priority), enabling the fastest response possible of the network equipment to the signalling command.

An alternative related embodiment to the above preferred embodiment will now be described.

Here, instead of the network control messages being encapsulated direct in to AAL5 cells, the messages are encapsulated into Internet Protocol datagrams at the network layer. The entire IP datagram containing the network control message is then buffered at the subscriber terminal. Once the entire datagram is buffered, it is encapsulated into ATM cells and transmitted to the access point using the MAC as described previously. At the access point, the contents of the ATM cells are buffered again, until the complete IP datagram is received. At this point, the access point has the opportunity to process the contents of the IP datagram which contains the signalling messages. The IP datagram can then be forwarded on to either another subscriber terminal or to the backhaul network. This arrangement has the advantage of incorporating guaranteed delivery and compatibility of the message with all networking equipment involved in the network. However, this would not use bandwidth as efficiently as the preferred embodiment, as the overhead incorporated in these messages would be more than is necessary.

What is claimed is:

1. A method of dynamic frequency allocation for use in a wireless communications network geographically arranged into regions, each region containing at least one fixed base station and one or more subscriber terminals, communications between the fixed base station and the one or more subscriber terminals in each region taking place over an allocated one of a plurality of communications channels available for use by the network, the method comprising the steps of:
  (a) monitoring the radio conditions on at least the allocated channel in each region;
  (b) generating channel metrics including a metric for unrecoverable channel distortion corresponding to the monitored radio conditions on the channel; and
  (c) reallocating a different channel to at least those regions where the generated channel metrics including the metric for unrecoverable channel distortion indicate that the allocated channel in those regions is suffering interference;
  wherein steps (a), (b) and (c) are continuously repeated in order whereby channels may be dynamically reallocated to regions during continuous network operation.

2. A method according to claim 1, and further comprising the step of transmitting the generated channel metrics to a network control server year over a signalling channel.

3. A method according to claim 2 wherein said reallocation step (c) is performed centrally by the network control server, channel reallocation information being transmitted from the network control server to at least the fixed base station in each region over the signalling channel.

4. A method according to claim 2, wherein said signalling channel is a permanent ATM VPI/VCI pair.

5. A method according to claim 1, wherein the monitoring step (a) further includes the step of monitoring a plurality of the available channels in addition to the allocated channel in each region and the generating step (b) includes the step of generating one or more respective channel metrics, where said channel metrics include the correlation levels obtained by correlating a known training sequence corresponding to the allocated channel with each, respective training sequence corresponding to each of the plurality of monitored channels corresponding to the respective radio conditions on each of the plurality of monitored channels.

6. A system arranged to perform dynamic channel allocation for use in a wireless communications network geographically arranged into regions, each region containing at least one fixed base station and one or more subscriber terminals, communications between the fixed base stations and the one or more subscriber terminals in each region taking place over an allocated one of a plurality of wireless communications channels available for use by the network, the system comprising:
  (a) monitoring means for monitoring the radio conditions on at least the allocated channel in each region;
  (b) metric generation means for generating one or more channel metrics including an unrecoverable channel distortion metric corresponding to the monitored radio conditions on the channel; and
  (c) channel reallocation means for reallocating a different channel to at least those regions when the generated channel metrics including the unrecoverable channel distortion metric indicate that the allocated channel in those regions is suffering interference;
  wherein said monitoring means, said metric generation means and said channel reallocation means each repeat their operations in order whereby channels may be dynamically reallocated to regions during continuous network operation.

7. A system according to any of claim 6 and further comprising transmission means for transmitting the generated channel metrics to a network control server over a signalling channel.

8. A system according to claim 7 wherein said reallocation means (c are located at the network control server, channel reallocation information generated by the channel reallocation means being transmitted from the network control server to at least the fixed base station in each region over the signalling channel.

9. A system according to claim 7, wherein said signalling channel is a permanent ATM VPI/VCI pair.

10. A system according to any of claim 6, wherein the monitoring means (a) are further arranged to monitor a plurality of the available channels in addition to the allocated channel in each region and the metric generation means are further arranged to generate one or more respective channel metrics including the correlation levels obtained by correlating a known training sequence corresponding to the allocated channel with each respective training sequence corresponding to the respective radio conditions on each of the plurality of monitored channels.

* * * * *